United States Patent [19]

Müller et al.

[11] Patent Number: 4,714,095

[45] Date of Patent: Dec. 22, 1987

[54] METHOD OF SALVAGING A PIPE CONDUIT BURIED UNDER GROUND

[75] Inventors: Hans Müller, Brauergildestrasse 5, 4938 Schieder-Schwalenberg; Hermann Suerbaum, Schieder-Schwalenberg, both of Fed. Rep. of Germany

[73] Assignee: Hans Müller, Schieder-Schwalenberg, Fed. Rep. of Germany

[21] Appl. No.: 930,658

[22] Filed: Nov. 13, 1986

[51] Int. Cl.$^4$ .................. F16L 55/16; B29C 17/00
[52] U.S. Cl. ............................. 138/98; 138/97; 138/105; 156/287; 264/35
[58] Field of Search ............. 138/97, 98, 105, 156; 156/287, 294, 295, 330; 405/150, 152; 264/269, 516, 512, 523, 35

[56] References Cited

U.S. PATENT DOCUMENTS

| | | | |
|---|---|---|---|
| 2,312,993 | 3/1943 | Stephens | 138/98 X |
| 4,064,211 | 12/1977 | Wood | 156/287 X |
| 4,135,958 | 1/1979 | Ossett | 138/97 X |
| 4,273,605 | 6/1981 | Ross | 156/295 X |
| 4,456,401 | 6/1984 | Williams | 138/97 X |
| 4,581,085 | 4/1986 | Wood | 138/97 |
| 4,602,974 | 7/1986 | Wood et al. | 156/287 |
| 4,637,754 | 1/1987 | Wood | 156/287 X |
| 4,640,313 | 2/1987 | Stanley | 138/97 X |

FOREIGN PATENT DOCUMENTS 2362784 6/1982 Fed. Rep. of Germany .
2240153 2/1986 Fed. Rep. of Germany .

*Primary Examiner*—James E. Bryant, III
*Attorney, Agent, or Firm*—Erwin S. Teltscher

[57] ABSTRACT

A method of salvaging a pipe conduit which is buried under ground, especially a sewer pipe, includes soaking a resin-absorbing inner layer of a lining hose, which further includes an impermeable outer layer that outwardly adjoins and surrounds the inner layer, with a first resin. The lining hose is then placed into the pipe conduit. A surface region of a calibrating hose which is to contact the inner layer of the lining hose is provided with a layer containing a second resin. The lining hose is then shaped to conformingly line the pipe conduit. Such shaping involves introducing the calibrating hose into the lining hose in such a manner that the resin-containing layer of the calibrating hose contacts the inner layer of the lining hose and pressing the calibrating hose against the lining hose to urge the latter against the pipe conduit. Finally, at least one of the first and second resins is hardened. Preferably, the other resin contains a substance which chemically reacts with at least the one resin to cause the same to harden during the hardening step upon contact of the resin-containing and inner layers.

11 Claims, 5 Drawing Figures

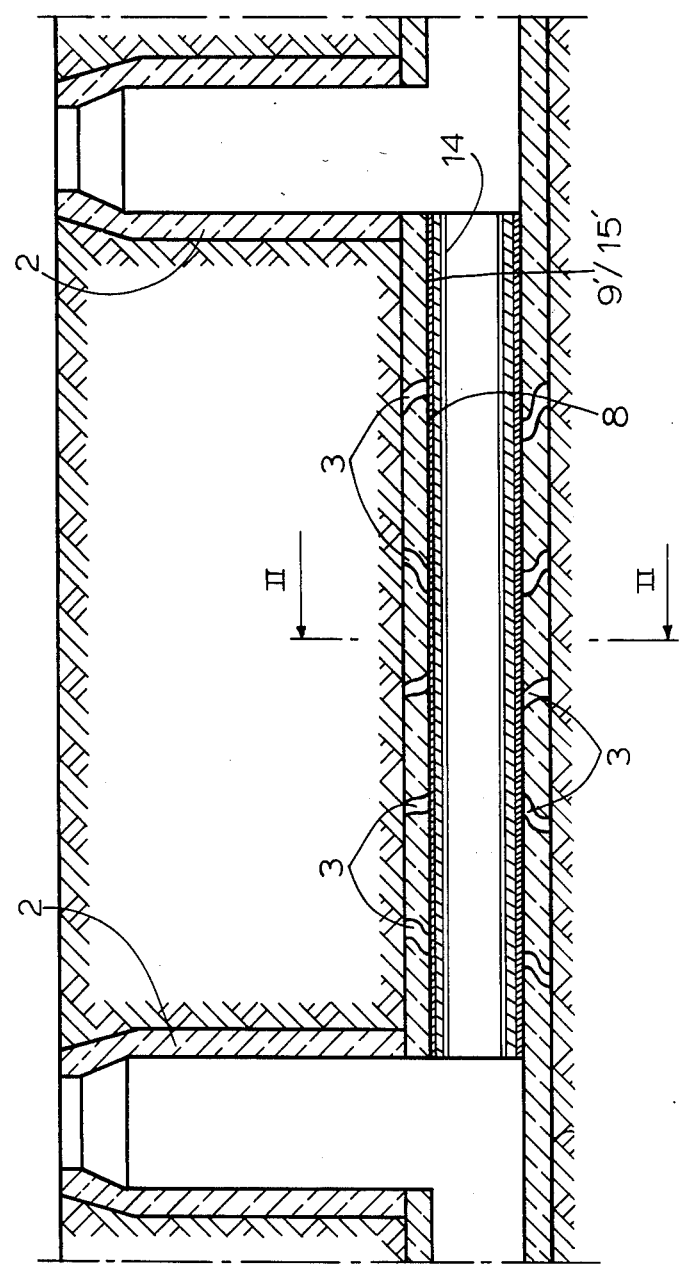

METHOD OF SALVAGING A PIPE CONDUIT BURIED UNDER GROUND

BACKGROUND OF THE INVENTION

The present invention relates to pipe conduits in general, and more particularly to a method of salvaging or restoring to use a pipe conduit which has suffered damage.

There are already known various methods of salvaging a pipe conduit which is buried under ground, especially of a sewage or waste water channel. Generally speaking, such methods include the use of a lining hose which frequently includes an impermeable layer and an adjacent resin-absorbing layer. This resin-absorbing layer is soaked or permeated with a resin prior to the introduction of the thus treated lining hose into the pipe conduit. After being properly positioned in the pipe conduit, the lining hose is pressed against the inner surface of the pipe conduit by a calibrating hose which is introduced into the interior of the lining hose, and the resin is caused to harden.

Methods of this kind are known for instance, from the German patent DE-PS No. 22 40 153 and DE-PS No. 23 62 784. In these methods, the hardening of the resin is accomplished by the application of heat. To this end, water is fed into the pipe conduit to be salvaged at a temperature of about 80° C. Depending on the particulars of the method used for introducing the calibrating hose into the lining hose, the warm or hot water is being supplied either during or after the introduction of the calibrating hose. Inasmuch as the hardening usually takes place over an extended time period, such as about 24 hours, the water used for hardening the resin must be maintained at the relatively high temperature needed for the hardening of the resin. As a consequence of the substantial amount of the warm or hot water required during the relatively long curing period for achieving the hardening or curing of the resin, there is required a commensurately high consumption of energy, with correspondingly high costs. Moreover, since the hardening or curing takes place, as already mentioned above, over the period of, for instance, 24 hours, it is necessary to provide for the supervision of the hardening or curing operation in the course of this curing time period, as a result of which the costs are further increased.

SUMMARY OF THE INVENTION

Accordingly, it is a general object of the present invention to avoid the disadvantages of the prior art.

More particularly, it is an object of the present invention to provide a method of salvaging damaged pipe conduits, which does not possess the drawbacks of the known methods of this type.

A further object of the present invention is to devise a method of the above type which assures proper formation of a hardened resin layer at a lining by which the pipe conduit is being salvaged.

Still another object of the present invention is to devise a method of the type here under consideration which achieves hardening of the resin present at the lining in a relatively simple and low-cost manner.

It is yet another object of the present invention to develop the above method in such a manner that the lining of the salvaged pipe conduit is relatively sturdy and becomes self-supporting within a relatively short period of time.

A concomitant object of the present invention is to make the method of the above type relatively simple, inexpensive, and easy to use.

In keeping with these objects and others which will become apparent hereafter, one feature of the present invention resides in a method of salvaging a pipe conduit which is buried under ground, especially a sewer pipe, this method including the steps of soaking a resin-absorbing inner layer of a lining hose, which further includes an impermeable outer layer that outwardly adjoins and surrounds the inner layer, with a first resin; placing the lining hose into the pipe conduit; providing a surface region of a calibrating hose which is to contact the inner layer of the lining hose with a layer containing a second resin; shaping the lining hose to conformingly line the pipe conduit, including introducing the calibrating hose into the lining hose in such a manner that the resin-containing layer of the calibrating hose contacts the inner layer of the lining hose and pressing the calibrating hose against the lining hose to urge the latter against the pipe conduit; and hardening at least one of the first and second resins. It is particularly advantageous when the other resin contains a substance which chemically reacts with at least the one resin to cause the same to harden during the hardening step upon contact of the resin-containing and inner layers.

It is now possible by resorting to the present invention to achieve the hardening or curing of the resin in an astonishingly simple manner without supplying any external heat energy. As a result of this, the encountered costs are considerably reduced. In addition thereto, the hardening is considerably accelerated, as a result of which the process of installing the lining is significantly shortened, with attendant further reduction of the cost. It can be assumed that, when the calibrating hose is provided with a suitable coating, the duration of the hardening operation is reduced to only about 25% of that required prior to the present invention.

It is especially advantageous when, in accordance with another aspect of the present invention, the other resin also hardens during the hardening step inasmuch as it can then be assumed that a three-layer lining is formed from the original two-layer lining and calibrating hoses. Hereby, the required amount of the hardenable material is not increased with respect to that needed in the performance of heretofore known methods. More particularly, it must be started from the premise that a given amount of the hardened resin is required for the lining hose to obtain the requisite stiffness or rigidity. When the method of the present invention is used, it can be assumed that the calibrating hose forms a part of the lining hose after the hardening of the resin, inasmuch as the chemical reaction can be considered in the sense of fulling or combining the resin-containing layers.

It is further particularly advantageous when the providing step includes forming a resin-absorbing layer at the aforementioned surface region of the calibrating hose, and permeating the resin-absorbing layer with the second resin, since then the calibrating hose differs from the lining hose only in that the resin-absorbing layer of the calibrating hose is situated at the exterior of the calibrating hose, while the resin-absorbing layer of the lining hose is disposed in the interior of the lining hose. Especially under these circumstances, it is advantageous when at least one of the inner and resin-containing layers contains an amount of the respective resin which is in excess of that needed to saturate the respective layer, and when the method further comprises the step of forming flow-through openings in the impermeable layer of the lining hose for the escape of the excess resin amount therethrough to the exterior of the lining hose to form an additional sealing body thereat. In this situation, there is obtained an additional sealing effect, in that the excess resin can then penetrate, for instance, into cracks or fissures of the pipe conduit or into leaking pipe conduit connections or joints.

Inasmuch as the lining hose is pulled or floated during the performance of the method of the present invention into the interior of the pipe conduit, the lining hose can be constituted in an especially advantageous manner as a resin-soaked glass fiber hose. In heretofore known methods of this kind, in accordance with which the lining hose is introduced into the pipe conduit to be repaired or salvaged by the turning-over or inversion technique, it is impossible to construct the lining hose as a glass fiber lining hose. More particularly, the relatively high amount of fulling work and relatively high deformations during the turning-over or inversion of the lining hose do not permit the use of glass fiber hoses as the lining hoses. However, the use of materials with a high modulus of elasticity, such as glass, is of an extreme importance for the salvaging of pressure conduits, such as those used for water or gas.

According to an advantageous facet of the present invention, the shaping step includes gradually advancing a turned-over zone of the calibrating hose by a pressurized medium into the lining hose in such a manner that the resin-containing layer of the calibrating hose is situated at the exterior of the calibrating hose after the turning over. Advantageously, the first and second resins are synthetic resins. It is especially advantageous when at least one of the synthetic resins is an epoxide resin or a polyester resin. The method of the present invention may advantageously further comprise the step of adding to at least one of the resins an additive which influences the resin behavior during the hardening step.

BRIEF DESCRIPTION OF THE DRAWING

The present invention will be described below in more detail with reference to the accompanying drawing in which:

FIG. 3 is a view similar to FIG. 1 but after the shaping of the lining hose;

DETAILED DESCRIPTION OF THE PREFERRED EMBODIMENT

Figure 1:
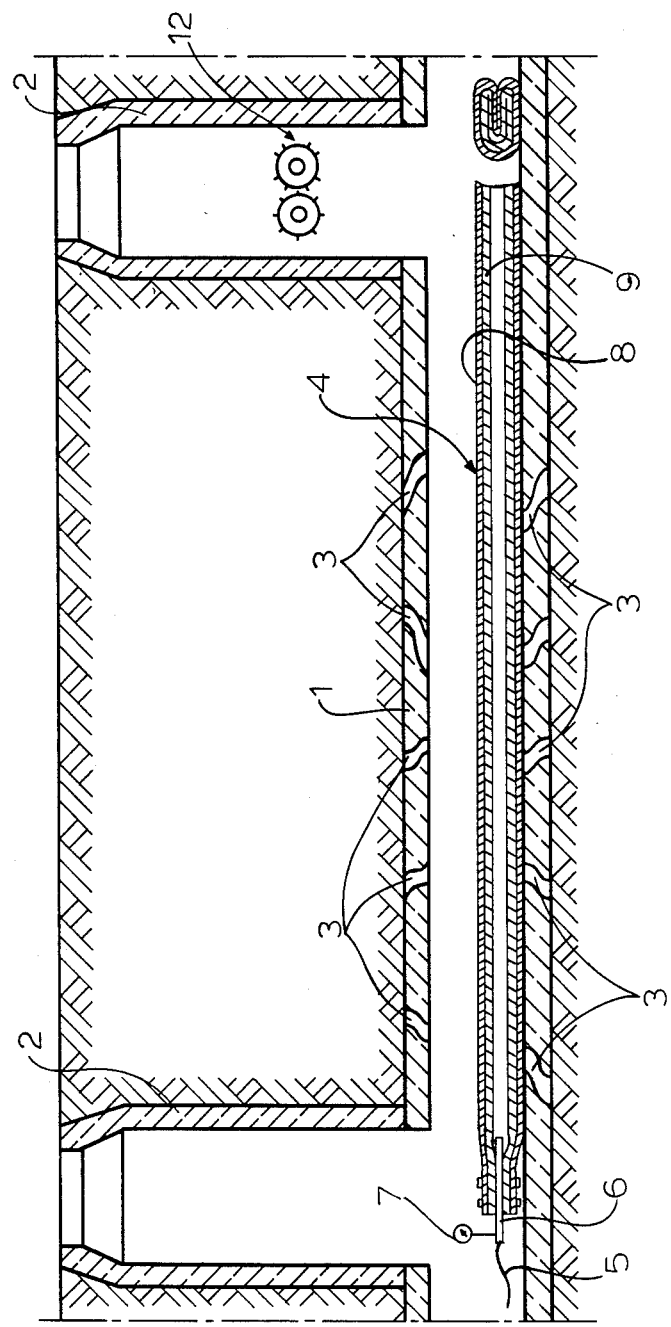
FIG. 1 is a longitudinal sectional view of a pipe conduit section located between two control shafts with a lining hose received therein in its collapsed state.

Referring now to the drawing in detail, and first to FIG. 1 thereof, it may be seen that the reference numeral 1 has been used therein to identify a pipe conduit which is buried under ground. The pipe conduit 1 is shown to be provided with control shafts 2 leading to the surface. FIGS. 1 and 3 show substantially only that section of the pipe conduit 1 which is situated between two such control shafts 2. The pipe conduit 1 includes, for instance, a plurality of cracks or fissures 3.

A lining hose 4 is shown to be already received in the interior of the section of the pipe conduit 1 which is situated between the two aforementioned control shafts 2, having been brought into the illustrated position in its flattened or collapsed state by being pulled by means of a rope or cable 5 and a non-illustrated winch or floated. The free end of the rope or cable 5 and the adjacently disposed end of the lining hose 5 are secured to a pulling member 6 which is provided with a non-illustrated air outlet channel in which there is incorporated an outlet valve 7.

The lining hose 4 consists of an outer covering layer 8 and of an inwardly adjacent inner layer 9 which is made of a material capable of absorbing a resin. In the position of the lining hose 4 which is illustrated in FIG. 1 of the drawing, the inner layer 9 is already soaked with resin. The lining hose 4 can be made, for example, of a non-woven fibrous material or fleece which is provided with an external coating of a synthetic plastic material, such as, for example, polyurethane. The shape of the lining hose 4 may be seen from FIG. 1. As depicted therein, one side of the lining hose 4 is folded over inwardly in the form of a lateral fold. In a non-illustrated manner, a body of water could be introduced into the pipe conduit 1, which has been previously cleaned, to such a level that the lining hose 4 would rest with its width on this body of water.

Figure 4:
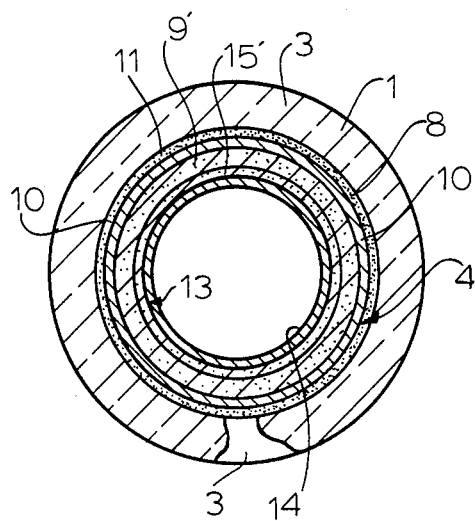
FIG. 4 is a partial sectional view at an enlarged scale and taken along the line IV—IV of FIG. 3.

As may be ascertained from FIG. 4 of the drawing, the outer covering layer 8 is provided with flow-through openings 10 through which excess resin present in the inner layer 9 flows while the lining hose 4 is being pressed against the internal surface of the pipe conduit 1 in order to form an additional film 11. This additional film 11 is indicated in FIG. 4 of the drawing to constitute a circular ring having a constant thickness. However, in contradistinction to what is shown, the additional film 11 could also have regions of different thicknesses and penetrate into the cracks or fissures 3.

The openings 10 are pierced into the outer covering layer 8 during the introduction of the lining hose 4 into the pipe conduit 1. To this end, a piercing mechanism or perforating puncher 12 of a known construction which will not be described here in any detail is provided in the respective control shaft 2 in the manner shown in FIG. 1 of the drawing.

Figure 2:
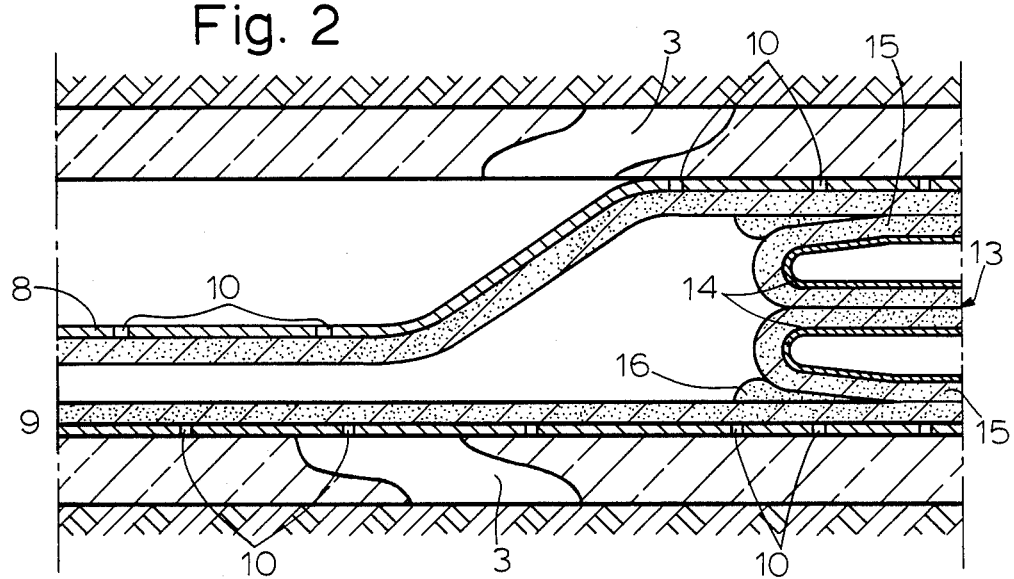
FIG. 2 is a view similar to FIG. 1 but at an enlarged scale and showing only a section of the pipe conduit during the advancement of a turned-over region of an auxiliary hose into the lining hose.

The pressing of the lining hose 4 against the internal surface of the pipe conduit 1 by means of a calibrating hose 13 which will be described in more detail below is illustrated in FIG. 2 of the drawing. The calibrating hose 13 consists of two layers 14 and 15. The layer 15 is constituted by a resin-absorbing material, whereas the layer 14 is formed by an impermeable foil. As may be perceived from FIG. 2, the resin-absorbing layer 15 is situated at the inside prior to the introduction of the calibrating hose 13 into the lining hose 4. The introduction of the calibrating hose 13 is accomplished in a manner which is already known by a turning-over technique which is also known in the affected branch of technology as inversion. In this manner, the resin-absorbing layer 15 is brought to the exterior and comes into contact with the inner layer 9 of the lining hose 4 which is also soaked with resin. The turning-over or the calibrating hose 13 is achieved in a manner which is not illustrated and will not be discussed in any detail by a pressurized medium, for example, by a water column having a constant height. After the resin has hardened, the original resin-soaked layers 9 and 15 form a unitary layer consisting of hardened layers 9' and 15'.

As a result of the pressure loading of the calibrating hose 13, the lining hose 4 is reshaped from its flat or collapsed state to the internal cross-sectional shape of the pipe conduit 1 and is pressed against the internal surface of the pipe conduit 1. During this operation, the excess resin, which may be contained in one or both of the resin-absorbing layers 9 and 15, is expressed or called to flow through the flow-through openings 10 to the exterior of the lining hose 4. Moreover, some of the excess resin moves in front of the turning-over region of the calibrating hose 13 in the form of a bulge 16.

In the particularly advantageous embodiment in which the excess resin is pushed out through the flow-through openings 10 of the outer covering later 8 of the lining hose 4, it is in an advantageous manner the inner layer 9 of the lining tube 4 which is provided with the amount of resin which exceeds that needed for saturation.

Figure 5:
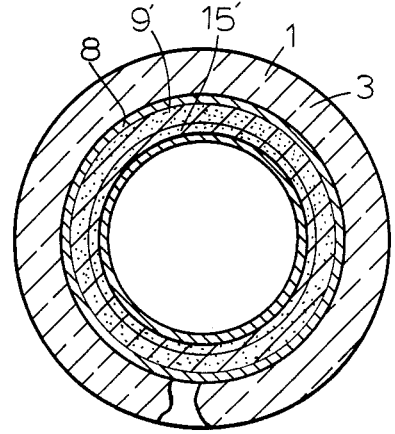
FIG. 5 is a view similar to FIG. 4 but showing a modified construction of the lining hose.

A slightly modified construction of the pipe conduit 1 is illustrated in a longitudinal section in FIG. 3 of the drawing in its already salvaged condition. The same salvaged pipe conduit 1 is shown in FIG. 5 of the drawing in cross section. As a comparison of these Figures will reveal, the outer covering layer 8 is completely closed or impervious in this modified construction. The inner layer 9 of the lining tube 4 and the outer layer 15 of the calibrating tube 13 again form the unitary layer consisting of the hardened layers 9' and 15'. The foil which, after the turning-over or inversion of the calibrating tube 13, forms the internal surface region of the salvaged pipe conduit, is again identified with the reference numeral 14.

It may be seen in FIG. 4 of the drawing that the film 11 which is formed between the outer covering layer 8 of the lining hose 4 and the inner surface of the pipe conduit 1 being salvaged has a constant thickness. However, in practical applications, this film 11 can also have an irregular shape. This irregular shape is caused by the fact that the excess resin also penetrates into the fissures or cracks 3 or into the joints or sockets of the pipe conduit 1. As already mentioned before, the inner layer 9 of the lining hose 4 and the externally located layer 15 of the calibrating hose 13, which were initially permeated with liquid resin, are identified in FIG. 4 of the drawing after hardening of the resin by the reference numerals 9' and 15', respectively. The limiting surfaces of these layers 9' and 15' that contact one another are indicated in the drawing by a thin solid line. However, since the resin which is contained in the layers 9 and 15 prior to hardening becomes mixed and/or reacts with one another, it can be safely assumed that, due to the cross-linking, a single unitary layer is formed from the inner layer 9' and the outer layer 15', so that the aforementioned thin solid line is to be considered to be representative merely of an imaginary limiting surface.

The construction depicted in FIG. 5 of the drawing differs from that of FIG. 4 in that the outer layer 8 of the lining hose 4 is impermeable to the resin. As a consequence of this, there is no adhesive connection of the lining hose 4 to the inner surface of the pipe conduit 1 and also no additional sealing effect at the interface between the lining hose 4 and the pipe conduit 1. After the hardening of the resin, the composite three-layer hose consisting of the two original two-layer hoses 4 and 13 can be viewed as a free-standing or self-supporting lining of the pipe conduit 1.

Which one of the above-mentioned possibilities or configurations will be used depends on the respective conditions encountered and requirements to be satisfied.

In contrast to the pipe conduits 1 shown in FIGS. 4 and 5, which have circular cross sections, even pipe conduits 1 having cross-sectional configurations differing from circular can be just as easily restored to use or salvaged in accordance with the method of the present invention.

The duration or speed of the chemical reaction, that is, of the hardening or cross-linking, can be influenced by the addition of further ingredients or substances to the resin or resins being used. The same resin, which is hardenable, for instance, by the application of heat thereto, may be introduced into each of the layers 9 and 15. However, it is also contemplated by the present invention to utilize two-component resins, that is resins which remain liquid until mixed with one another and whose hardening or setting commences upon such mixing. In this case, one of such components may be contained in one of the layers 9 and 15, such as in the layer 9 and the other may be present, possibly in mixture with an additional amount of the one component, in the other of the layers 9 and 15, such as in the layer 15, so that curing of the resin of the one layer 9 or 15 begins only after the admixture of the other component thereto as the layers 9 and 15 are pressed against one another during the expansion or shaping of the lining hose 4 by the calibrating hose 13. Thus, when reference is being had herein to a resin, the respective one of the aforementioned components of the two-component resin or its mixture with the respective other component are intended to be embraced by this term as well. Polyester resins, epoxide resins and polyurethane systems or components of such resins are preferably being chosen as the resins used for soaking the layers 9 and/or 15.

While the present invention has been described and illustrated herein as embodied in a method restoring a specific construction of a pipe conduit to use, it is not limited to the details of this particular construction, since various modifications and structural changes are possible and contemplated by the present invention. Thus, the scope of the present invention will be determined exclusively by the appended claims.

What is claimed is:

1. A method of salvaging a conduit which is buried under ground, especially a sewer pipe, comprising the steps of
   permeating resin-absorbing inner layer of a lining hose, which further includes an impermeable outer layer that outwardly adjoins and surrounds the inner layer, with one resin;
   placing the lining hose into the conduit;
   providing a surface region of a calibrating hose which is to contact the inner layer of the lining hose with a layer containing another resin;
   shaping the lining hose to conformingly line the conduit, including introducing the calibrating hose into the lining hose in such a manner that the resin-containing layer of the calibrating hose contacts the inner layer of the lining hose and pressing the calibrating hose against the lining hose to urge the latter against the conduit; and
   hardening at least one of the first and second resins.

2. The method as defined in claim 1, wherein the other resin contains a substance which chemically reacts with at least the one resin to cause the same to harden during said hardening step upon contact of the resin-containing and inner layers.

3. The method as defined in claim 1, wherein the other resin also hardens during said hardening step.

4. The method as defined in claim 1, wherein said providing step includes forming a further resin-absorbing layer at said surface region of the calibrating hose, and permeating the further resin-absorbing layer with said other resin.

5. The method as defined in claim 4, wherein at least one of said resin-containing layers contains an amount of the respective resin permeating it which is in excess of that needed to saturate it; and further comprising the step of forming flow-through openings in the impermeable layer of the lining hose for the escape of the excess resin amount therethrough to the exterior of the lining hose to form an additional sealing body thereat prior to placing the lining hose into the conduit and introducing the calibrating hose into the lining hose.

6. The method as defined in claim 1, wherein said lining hose is a resin-soaked glass fiber hose.

7. The method as defined in claim 1, wherein said shaping step includes gradually advancing a turned-over zone of the calibrating hose by a pressurized medium into the lining hose in such a manner that the resin-containing layer of the calibrating hose is situated at the exterior of the calibrating hose after the turning over.

8. The method as defined in claim 1, wherein the resins are synthetic resins.

9. The method as defined in claim 8, wherein at least one of said synthetic resins is an epoxide resin.

10. The method as defined in claim 8, wherein at least one of said synthetic resins is a polyester resin.

11. The method as defined in claim 1, and further comprising the step of adding to at least one of said resins an additive which influences the resin behavior during said hardening step.

* * * * *